United States Patent [19]

Obayashi et al.

[11] 4,410,575

[45] Oct. 18, 1983

[54] LAP WELDING METHOD FOR TEXTILE FABRICS

[75] Inventors: Tsutomu Obayashi, Tokyo; Hideyuki Hiraoka, Musashino, both of Japan

[73] Assignee: Hiraoka & Co., Ltd., Tokyo, Japan

[21] Appl. No.: 340,396

[22] Filed: Jan. 18, 1982

[30] Foreign Application Priority Data

Jul. 16, 1981 [JP] Japan ................................ 56/109963

[51] Int. Cl.³ ........................ B65H 69/02; B65H 69/06

[52] U.S. Cl. ...................................... 428/57; 156/157; 156/272.2; 156/275.3; 156/308.2; 156/308.4

[58] Field of Search .................. 156/157, 272.2, 274.8, 156/275.1, 275.3, 308.2, 308.4, 502, 505; 428/57

[56] References Cited

U.S. PATENT DOCUMENTS 2,771,121 11/1956 MacCaffray ........................ 156/157

3,970,079 7/1976 Gaylord, Jr. ........................ 156/157

FOREIGN PATENT DOCUMENTS 2423216 12/1974 Fed. Rep. of Germany ...... 156/157

*Primary Examiner*—Michael G. Wityshyn

*Attorney, Agent, or Firm*—Benasutti and Murray

[57] ABSTRACT

Textile fabrics are firmly lap welded to each other by superposing two end portions of one or two fabrics on each other while interposing a piece of a synthetic polymeric bonding tape between the superposed two end portions and by applying a high frequency wave treatment and/or heat treatment to the interposed portion of the bonding tape through at least one of the superposed end portions while pressing them, to melt the interposed portion of the bonding tape thereby lap welding the end portions of the fabric or fabrics to each other.

10 Claims, 6 Drawing Figures

1 3 3a 12 C D 13 4a 4 11 2

LAP WELDING METHOD FOR TEXTILE FABRICS

FIELD OF THE INVENTION

The present invention relates to a lap welding method for textile fabric. More particularly, the present invention relates to a method for lap welding two end portions of a fabric or fabrics with a bonding tape by applying a high frequency wave and/or heat treatment thereto.

BACKGROUND OF THE INVENTION

It is known that in order to incorporate two pieces of fabric into one body, the end portions of the fabrics to be incorporated are bonded, in place of a sewing procedure, by applying a bonding agent or adhesive to the end portions, by superposing the end portions while pressing them and by solidifying the bonding agent or adhesive interposed between the end portions of the fabric or fabrics. However, this type of bonding procedure not only takes much time and much labor, but also, is difficult to apply to a fabric in which yarns located in the cut end portions thereof are easily frayed. Also, the resultant bonded fabric sometimes exhibits an unsatisfactory bonding strength while the bonded fabric is practically used.

Also, it is known that when the fabric or fabrics are coated with a synthetic polymer material, for example, polyvinyl chloride, which is capable of fuse-bonding the fabrics, the fabrics can be bonded to each other by applying a high frequency wave and/or heat treatment thereto. However, the above-mentioned coated fabric is very heavy because the fuse-bonding synthetic polymer material such as polyvinyl chloride has a large specific gravity. In order to make the coated fabric light weight, the heavy synthetic polymer material can be replaced by another synthetic polymer material, for example, acrylic resin or chloro-sulfonated polyethylene, having a low specific gravity. However, those low specific gravity synthetic resins are not capable of providing bonding activity for the fabric even by applying a high frequency wave and/or heat treatment thereto. Therefore, this type of coated fabric can be bonded only by using a bonding agent or an adhesive having the above-mentioned disadvantages.

In the case where woven fabrics having yarns which are located close to the edge of the end portion thereof, and easily fray, are bonded together, each end portion is usually folded once or twice, and the folded end portions are superposed on each other. Therefore, the superposed end portions make an undesirably large thickness. In another bonding manner, the area of the superposed end portions is made quite large. However, this manner is not economical and results in an undesirable appearance of the bonded product. Also, the bonded product sometimes exhibits an unsatisfactory bonding strength, and the yarns located close to the edges of the bonded end portions are sometimes frayed.

SUMMARY OF THE INVENTION

An object of the present invention is to provide a lap welding method for textile fabrics which method can be easily carried out and results in a welded product having an excellent bonding strength.

The above-mentioned object can be attained by the lap welding method of the present invention which comprises the steps of:

superposing two end portions of one or two textile fabrics one over the other while interposing a piece of bonding tape consisting essentially of a thermally melting synthetic polymer material, between the superposed two end portions, and;

applying high frequency waves and/or heat to at least the interposed portion of the bonding tape and pressing said superposed end portions of said fabric or fabrics and said interposed portion of said bonding tape all together, to melt the interposed portion of the bonding tape and to lap weld the superposed end portions to each other.

In the method of the present invention, the resistance of the resultant welded fabric to peeling can be enhanced by interposing the bonding tape between the superposed end portions of the fabric or fabrics in such a manner that at least one side edge portion of the bonding tape extends outwardly over the corresponding edge of the end portion.

BRIEF DESCRIPTION OF THE INVENTION

FIG. 1 is an explanatory cross-sectional profile of a bonded fabric in accordance with the method of the present invention, FIG. 2 is an explanatory cross-sectional profile of the bonded fabric as indicated in FIG. 1 when a peeling force is applied thereto, FIG. 3 is an explanatory cross-sectional profile of another bonded fabric in accordance with the method of the present invention, and FIGS. 4, 5 and 6 are respectively an explanatory cross-sectional profile of the bonded fabric as indicated in FIG. 3 when a peeling force is applied thereto.

DETAILED DESCRIPTION OF THE INVENTION

Figure 1:
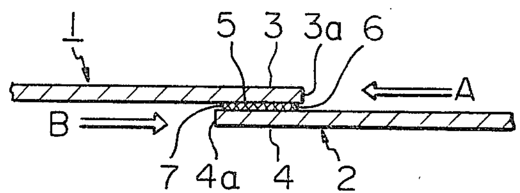

The lap welding method of the present invention is characterized in that a bonding tape consisting essentially of a thermally melting synthetic polymer material is interposed (sandwiched) between two end portions of a fabric or fabrics superposed on each other, and a high frequency wave treatment and/or heat treatment is applied to at least the interposed portion of the bonding tape through at least one of the superposed end portions, while pressing them. By the high frequency wave treatment and/or heat treatment, the interposed portion of the bonding tape is melted and the superposed end portions of the fabric or fabrics are lap welded to each other by the melted polymer material. Thereafter, the bonded end portions of the fabric or fabrics is allowed to stand so that the melted polymer material is cooled and solidified.

In the method of the present invention, the fabric or fabrics to be welded are not limited to a specific group of fabrics as long as the fabrics per se can be bonded by the method of the present invention, but are not deteriorated by the high frequency wave treatment and/or heat treatment. That is, the fabric may be any woven fabric, knitted fabric or non-woven fabric. However, the method of the present invention is preferably applied to heavy fabrics, for example, woven canvases water-proof fabrics, rubber sheets or synthetic polymer sheets, having a weight of 100 $g/m^2$ or more, more preferably, 200 $g/m^2$ or more, and a thickness of 0.1 mm or more, more preferably, 0.3 mm or more.

Also, the method of the present invention is preferably applied to woven fabrics in which yarns located in the cut end portion thereof are easily frayed. For example, when a woven fabric having both densities of warp and weft of 130 yarns/2.54 cm or having a density of either one of warp and weft of 200 yarns/2.54 cm or less and a density of the other of 60 yarns/2.54 cm or less, and having a weight of 200 g/m$^2$ or less, is cut, the yarns located in the cut end portions of the fabric are easily frayed. The woven fabric may be a water-proof fabric or another processed fabric.

The fabrics usable for the method of the present invention may be made of any type of fibers, that is, natural fibers, for example, cotton, linen and jute; regenerated fibers, for example, rayon and cupra; semi-synthetic fibers, for example, cellulose acetate fibers; synthetic fibers, for example, nylon 6, nylon 66, polyethylene terephthalate, polyacrylic, polyolefin or water-insolubilized polyvinyl alcohol fibers; mineral fibers, for example, glass fibers and; mixtures of two or more of the above-mentioned type of fibers. In the case of a woven fabric or knitted fabric, the fibers may be in the form of staple fibers, multifilaments, and also, in the form of a spun yarn, multifilament yarn, monofilament yarn, split yarn or tape yarn.

The fabric may be a water-proof fabric coated or impregnated with a water-proofing or water-repellent agent, for example, air-permeable water-repellent agent such as paraffin; wax; metallic salts such as aluminium acetate; metallic soaps such as aluminium soap; rosin soap, zirconium compounds such as zirconium salts of fatty acids; silicone compounds such as methylhydrogen polysiloxane; chromium complexes such as stearyl chromic chloride; octadecyloxymethylpyridinium chloride; stearamidemethylpyridinium chloride; octadecylethylene urea; alkylketone dimers, methylol stearamide, and; perfluorocarbon compounds. The above-mentioned air-permable water repellent agent has no welding activity for the fabric even when the high frequency wave treatment and/or heat treatment is applied thereto.

The fabric may be coated or impregnated with an air-impermeable water-proofing agent which may or may not have a welding activity with the fabric when the high frequency wave treatment and/or heat treatment is applied thereto. The water-proofing agent having the welding activity may be selected from polyvinyl chloride, vinyl chloride-vinyl acetate copolymers, ethylene-vinyl acetate copolymers, ethylene-vinyl chloride copolymers, polyurethanes and polyamides, for example, nylon 11 and nylon 12. The water-proofing agent having no welding activity may be selected from the group consisting of acrylic resins such as polyacrylic alkyl esters, petroleum resins, alkyd resins, chlorosulfonated polyethylene resins, polyoelfins, melamine resins and cross-linked rubbers.

The bonding tape usable for the method of the present invention consists essentially of a synthetic polymer material capable of thermally melting at a temperature of 100° to 350° C. The polymer material consists of at least one member selected from the group consisting of polyvinyl chloride, polyurethanes, polyamides such as nylon 11 and nylon 12, polyesters such as polyethylene terephthalate, ethylene-vinyl acetate copolymers and vinyl chloride-vinyl acetate copolymers.

The bonding tape may be of any dimensions. However, it is preferable that the bonding tape has a width of from 10 to 60 mm, more preferably, 20 to 50 mm and a thickness of 0.05 mm or more, more preferably, 0.1 to 1.5 mm, still more preferably, 0.2 to 1.0 mm.

In the first step of the method of the present invention, two end portions of one or two fabrics are superposed one over the other while interposing a piece of bonding tape between the superposed two end portions.

Referring to FIG. 1, in order to lap weld a fabric 1 to a fabric 2, an end portion 3 of the fabric 1 is superposed on an end portion 4 of the fabric 2 and a bonding tape 5 is interposed between the end portions 3 and 4.

In the second step of the method of the present invention, a high frequency wave treatment and/or a heat treatment is applied to at least the interposed portion of the bonding tape and a pressing operation is applied to the superposed end portions of the fabric or fabrics and the interposed portion of the bonding tape. By this procedure, the interposed portion of the bonding tape is melted so as to lap weld the superposed end portions to each other with the melted portion of the bonding tape.

The high frequency wave treatment can be carried out by applying high frequency waves having a frequency of from 13 to 58.50 MHz, preferably, from 13 to 45 MHz, generated from a high frequency wave oscillator, to the interposed portion of the bonding tape through at least one of the superposed end portions of the fabric or fabrics.

Also, the heat treatment can be conducted by directly heating the interposed portion of the bonding tape to a temperature of 100° to 350° C., usually, from 150° to 300° C. and above the melting point of the bonding tape, and by pressing the superposed end portions of the fabric or fabrics and the interposed, melted portion of the bonding tape.

Referring to FIG. 1, since the bonding tape 5 is completely interposed between the end portions 3 and 4 of the fabrics 1 and 2, the bonding tape 5 is completely melted by applying the high frequency wave treatment and/or heat treatment thereto. After the melted portion of the bonding tape is cooled and solidified, the end portions 3 and 4 are firmly bonded to each other.

Figure 2:
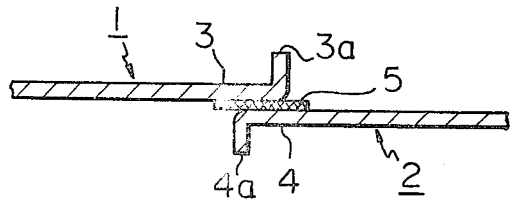

Referring to FIG. 1 again, a right side edge 6 of the bonding tape 5 is located inside the corresponding edge **3*a* of the fabric 1 and the left side edge 7 of the bonding tape 5 is located inside the corresponding edge 4*a* of the fabric 2. In this case, the edges 3*a* and 4*a* are free from bonding. Accordingly, when forces are applied in directions as indicated by arrows A and B to the edges 3*a* and 4*a*, these edge portions are sometimes peeled from each other, as indicated in FIG. 2. When this phenomenon continued, the fabric 1 is completely separated from the fabric 2**.

The end portions may be superposed on each other in such a manner that the edge of one of the superposed and portions comes just above the side edge of the bonding tape and the edge of the other end portion lies just below the other side edge of the bonding tape. However, even in this manner, it is difficult to completely bond the end portions of the fabric or fabrics to each other, without leaving unbonded small portions in the end portions of the fabric or fabrics. These unbonded small portions may cause the separation of the bonded end portions to be accelerated.

In order to eliminate the above-mentioned disadvantages, it is preferable that when the end portions of the fabric or fabrics are superposed on each other, the bonding tape is interposed between the superposed end portions in such a manner that at least one side edge portion of the bonding tape extends outwardly over the corresponding edge of the end portion. In this manner, both the side edge portions of the bonding tape may extend outwardly over the corresponding edges of the end portions, respectively.

Figure 3:
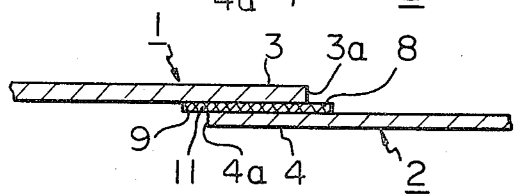

Referring to FIG. 3, when the end portion 3 of the fabric 1 is superposed on the end portion 4 of the fabric 2, a bonding tape 11 is interposed between the end portions 3 and 4 in such a manner that a right side edge portion 8 of the tape 11 extends to the outside of the edge 3*a* of the fabric 1 and a left side edge portion 9 of the tape 11 extends to the outside of the edge 4*a* of the fabric 2. In this case, in the welding procedure, only the interposed middle portion of the tape 11 between the end portions 3 and 4 of the fabric 1 and 2 is melted and converted into a welding layer so as to leave the side edge portions 8 and 9 non-melted. In this case, the end portions 3 and 4 of the fabrics 1 and 2 can be completely welded to each other by the middle portion of the bonding tape 11.

Figure 4:
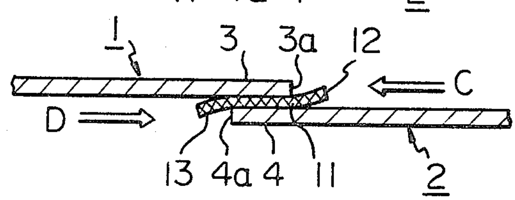
Figure 5:
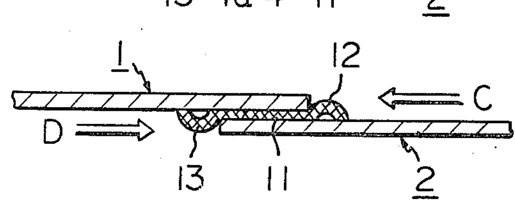
Figure 6:
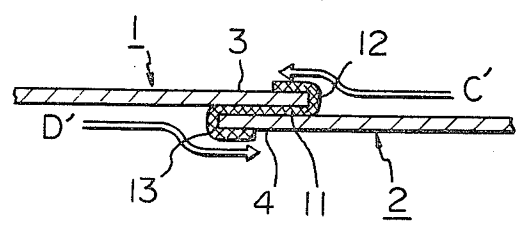

Referring to FIG. 4, the non-melted side edge portions of the tape 11 form fin-shaped projections 12 and 13 extending from the resultant weld. When forces in directions as indicated by arrows C and D are applied to the welded portion of the fabrics 1 and 2, portions of the forces can be absorbed by deforming the fin-shaped projections 12 and 13 as indicated in FIG. 4 or in FIG. 5. Thereafter, the remaining portions of the forces are consumed to deform the fin-shaped projections 12 and 13 as indicated in FIG. 6 and, then, led to outside of the welded portion in the directions as indicated by arrows C' and D'. Therefore, the fin-shaped projections 12 and 13 are remarkably effective for protecting the weld from peeling.

The fin-shaped projection preferably has a width of at least 0.3 mm, more preferably, from 1.0 to 3 mm.

In the method of the present invention, the weld preferably has a width of 20 to 40 mm.

For the convenience of the interposing operation of the bonding tape, both or either one surface of the bonding tape may have a layer of an adhesive, or both or either one of the end portions of the fabric or fabrics may be coated with a layer of an adhesive. The layer of the adhesive is effective for fixing the locations of the end portions of the fabric or fabrics and the bonding tape in a desired relationship to each other. However, the adhesive sometimes may decrease the welding effect of the bonding tape. Therefore, it is preferable that the area of the layer of the adhesive does not exceed 50% of the entire area of each end portion to be welded. The adhesive may be selected from well known adhesives, for example, acrylic resins, epoxy resins and petroleum resins.

The present invention will be further illustrated by the following examples, which are provided for the purpose of illustration and should not be interpreted as in any way limiting the scope of the present invention.

EXAMPLE 1

A fabric substrate was prepared by scouring a cotton canvas having a weight of 428 g/m$^2$ and a thickness of 0.7 mm with an aqueous solution of 5 g/l of sodium hydroxide, at a temperature of 85° C. for 30 minutes. The scoured cotton canvas was dyed with Indanthrene Olive MX, in an amount of 5% based on the weight of the scoured fabric by the usual method, and then, dried.

The dyed canvas was subjected to a usual water-proofing process by using a treating liquid containing paraffin and aluminium soap.

Edge portions of two pieces of the dyed canvas were superposed on each other in a width of 3 cm and a bonding tape made of polyethylene terephthalate and having a width of 4 cm and a thickness of 0.4 mm was interposed between the above-mentioned superposed end-portions, in such a manner that each side edge portion of the bonding tape having a width of 5 mm projected from the corresponding edge of the end portion of the fabric.

A high frequency wave treatment was applied at an output of 2 KW at a frequency of 40.68 MHz for 3 seconds to the superposed end portions of the fabrics and the interposed portion of the bonding tape.

The resultant weld exhibited an average resistance to peeling of 6.8 kg/3 cm.

The welded fabric was converted into a cover sheet for motor vehicles and could be practically used. After about four months of use, no peeling was found in the weld.

EXAMPLE 2

The same procedures as those described in Example 1 were carried out except that after the interposing procedure, the projected portions of the bonding tape were eliminated, and then, the high frequency wave treatment was carried out. The resultant weld exhibited an average resistance to peeling of 6.5 kg/3 cm.

4 months after the start of the practical use of the cover sheet, the weld was slightly peeled.

EXAMPLE 3

The same procedures as those described in Example 1 were carried out, except that the polyethylene terepthalate bonding tape was replaced by a polyvinyl chloride bonding tape having a width of 30 mm and a thickness of mm, 0.4 mm.

In order to lap weld the superposed end portions of the fabrics, a hot air welding machine equipped with a heater having an output of 700 W, a flat-shaped, hot air-blowing nozzle having a width of 40 mm, and a pressing roller made of a heat-resistant silicone rubber, was used. The hot air-blowing nozzle was inserted between the superposed end portion of the upper fabric and the interposed portion of the bonding tape, and hot air was blown to the interposed portion of the bonding tape to melt it while moving the nozzle at a speed of 10 m/min along the non-melted interposed portion in the longitudinal direction of the tape. The above-mentioned melting operation was followed by a pressing operation, applied to the superposed end portions of the fabric and the interposed, melted portion of the bonding tape, to lap weld them.

The resultant weld exhibited a resistance to peeling of 6.8 kg/3 cm.

EXAMPLE 4

A woven fabric was prepared from warps and wefts each consisting of polyethylene terepthalate fiber spun yarns having a metric yarn count of 52 at a warp density of 58 yarns/2.54 cm and a weft density of 61 yarns/2.54 cm. The woven fabric was scoured, dyed and dried by a conventional method.

The fabric was immersed in an aqueous emulsion containing a water-proofing agent comprising paraffin and zirconium compound at a dry solid concentration of about 30%, squeezed by a mangle, dried at a temperature of about 100° C. for 2 minutes and, finally, cured at a temperature of 160° C. for 30 seconds. The amount of the water-proofing agent (solid) on the fabric was 7 g/m$^2$. The water-proofed fabric exhibited a degree of water-repellency of 100 and a resistance to water pressure of 700 mm aqua.

An end portion of a piece of the fabric having a width of 3 cm was superposed on an end portion of another piece of the fabric and a nylon 12 bonding film having a width of 5 cm and a thickness of 0.15 mm was interposed between the above mentioned superposed end portions. In this combination, both side edge portion of the interposed bonding tape having a width of 10 mm were projected from the corresponding edges of the superposed end portions of the fabrics.

A high frequency wave treatment was applied at an output of 2 KW at a frequency of 40.68 MHz for 3 seconds to the superposed end portions of the fabrics and the interposed portion of the bonding tape.

The resultant weld exhibited an average resistance to peeling of 7.8 kg/3 cm.

The welded fabric was connected into a cover sheet and practically used for 6 months. No yarns were frayed from the weld.

We claim:

1. A lap welding method for use with textile fabrics, comprising the steps of:

superposing two textile fabric end portions one over the other while interposing a piece of bonding tape consisting essentially of a thermally melting synthetic polymer material between said superposed end portions, and;

applying high frequency waves and/or heat treatment to at least the interposed portion of said bonding tape and pressing said superposed end portions and said interposed portion of said bonding tape together to melt the interposed portion of said bonding tape and to lap weld said superposed end portions to each other;

wherein at least one side edge portion of said interposed bonding tape extends outwardly over a corresponding edge of one of said end portions, and;

wherein, after said end portions have been lap welded together, said extended side edge portion of said interposed bonding tape remains unmelted and in the form of a fin-shaped projection.

2. The method as claimed in claim 1, wherein said end portions essentially have no welding activity to each other when the high frequency wave and/or heat treatment is applied thereto without using said bonding tape.

3. The method as claimed in claim 1, wherein said fabric is a heavy fabric having a weight of 100 $g/m^2$ or more.

4. The method as claimed in claim 1, wherein said fabric is a water-proof fabric.

5. The method as claimed in claim 4, wherein said water-proof fabric contains a water-proofing agent which exhibits no welding activity for said fabric when the high frequency wave and/or heat treatment is applied thereto.

6. The method as claimed in claim 1, wherein said bonding tape consists essentially of at least one member selected from the group consisting of polyvinyl chloride, polyurethanes, polyesters, polyamides, vinyl chloride-vinyl acetate copolymers, and ethylene-vinyl acetate copolymers.

7. The method in claim 1, wherein said bonding tape has a thickness of 0.05 mm or more.

8. The method as claimed in claim 1, wherein both the side edge portions of said bonding tape extend outwardly over the corresponding edges of the end portions, respectively.

9. The method as claimed in claim 1, wherein the width of said extending side edge portion of said bonding tape is at least 0.03 mm.

10. A textile fabric lap welded by the method as claimed in claim 1.

* * * * *